United States Patent [19]

Zepf

[11] Patent Number: 5,171,445
[45] Date of Patent: Dec. 15, 1992

[54] ULTRAPOROUS AND MICROPOROUS MEMBRANES AND METHOD OF MAKING MEMBRANES

[75] Inventor: Robert F. Zepf, San Diego, Calif.

[73] Assignee: Memtec America Corporation, Timonium, Md.

[21] Appl. No.: 674,907

[22] Filed: Mar. 26, 1991

[51] Int. Cl.⁵ .................................... B01D 39/00
[52] U.S. Cl. ......................... 210/500.27; 264/41
[58] Field of Search ............ 210/500.41, 500.34, 210/504, 500.38, 500.43, 500.27; 264/41, 45.1, 49, 28

[56] References Cited

U.S. PATENT DOCUMENTS

| | | | |
|---|---|---|---|
| 3,158,532 | 12/1960 | Pall et al. | 210/504 |
| 3,883,626 | 5/1975 | Kamide et al. | 264/49 |
| 4,629,563 | 12/1986 | Wrasidlo | 210/500.34 |
| 4,774,039 | 9/1988 | Wrasidlo | 210/500.41 |

OTHER PUBLICATIONS

Ewing, Galen W., Instrumental Methods of Chemical Analysis, Third Edition, pp. 36, and 58-62, MacGraw-Hill Book Company.

Primary Examiner—W. Gary Jones
Assistant Examiner—Ana Fortuna
Attorney, Agent, or Firm—Waldron & Associates

[57] ABSTRACT

Ultraporous and microporous polymer membranes cast from metastable dispersions are significantly improved by limiting the time of environmental exposure to less than about 0.5, preferably less than 0.25 seconds, between casting about 10° to about 20° C. lower than the usual prior art values. The resulting membranes have far less debris entrained in the membrane, far more consistent and uniform pore sizes, a substantially greater number of skin pores, and greatly increased flow rates for any given pore diameter.

4 Claims, 5 Drawing Sheets

ULTRAPOROUS AND MICROPOROUS MEMBRANES AND METHOD OF MAKING MEMBRANES

BACKGROUND OF THE INVENTION

1. Technical Field of the Invention

The present invention relates to ultraporous and microporous membranes which are useful in materials separations, by filtration, dialysis, and the like, and as supports and containment media for materials, and related uses. In particular, it relates to highly asymmetric, integral membranes with a skin and a porous sub-structure or support region.

2. Description of the Prior Art

A wide diversity of polymer membranes are known, and have attained wide applicability in diverse uses. Such membranes are characterized by a variety of properties and characteristics, and the selection of a membranes for a particular use is generally a function of the properties required or desired.

The most characteristic property of concern for most applications is the effective controlling pore diameter, which defines what materials may pass through the membrane, and which are retained. Ultraporous membranes are generally those with an effective controlling pore diameter of less than about 0.050 micrometers (or sometimes considered to be less than about 0.025 micrometers), down to as 0.005 micrometers, which is the realm of the size of a molecule of, for example, simple sugars and the like. Microporous membranes are those with effective limiting pore diameters of greater than ultraporous, normally greater than about 0.050 micrometers, up to about 1 micrometer, or occasionally more.

As used in the present application, the term "pore diameter" is employed to represent the span across skin pores or controlling pores of a membrane. It is not intended to suggest that all pores are circular and, indeed, most are not, as those of ordinary skill in the art will understand and as FIG. 2 illustrates.

Smaller pore membranes extend into the reverse osmosis region and below that into the gas separation region. Reverse osmosis membranes are used for ionic separations, under high applied pressure differentials, sufficient to overcome osmotic pressure, and are sometimes said to be dependent on a mechanism which is often characterized as intermolecular dissolution. Such membranes have a dense, non-porous surface skin, and do not function by effects dependent on seive-like characteristics. As a distinguishing characteristic, reverse osmosis is, in material part, dependent on the osmolarity of a solution as a determinant of the separatory characteristics of the reverse osmosis operation, while ultraporous and microporous membranes pass or retain materials predominantly on the basis of their size, at applied pressure differential which are commonly far less, often an order of magnitude less, than reverse osmosis operations, and are ordinarily considered to be substantially different in kind. Gas separation membranes operate on a molecular scale and fractionate gas mixtures based on size and absorption/desorption characteristics.

An important property of porous membranes is their permeability to flow. In the majority of applications, it is commonly desirable to process effectively the greatest volume of a feed material in the least amount of time. All other things being equal, the higher the flow rate of filtrate or related materials through the membrane, the higher the efficiency and economy of the procedure.

It has long been known that flow rates are proportional to pore diameters and pore population. Taken together, these define an effective area through which fluids may pass. In practice, the relationship is ordinarily very approximate and highly variable.

Membranes may have a skin or may be skinless, i.e. with an isotropic structure from one face to the other. If a cast liquid film of adequate polymer concentration is quenched in a strong non-solvent, as with polysulfone solutions (or dispersions) quenched in water, the result is a "skinned" membrane, i.e., one with considerably smaller pores on the "skin" side than on the opposite side. If the quench liquid is a weak non-solvent, e.g., by adding solvent to the water, a more open skin and ultimately a skinless membrane can be produced.

When a skin is present, as generally in the case with gas separation, reverse osmosis, and ultrafiltration membranes and sometimes with microporous membranes, it is most often a dense film of polymer material with very small pores that extend into a support region of larger pores. If the pores are large enough, they can be observed by electron scanning microscopy, and this is true in the microporous range. However, because of the limitations of SEM techniques pores may not always be directly observable at diameters of less than about 0.050 micrometers, but their presence can be confirmed by the retentivity characteristics of the membrane.

Membranes can have different structures, generally determined by the technique by which it is synthesized. Examples include fibrous, granular, cellular, and spinodal, and they may be symmetrical, or asymmetric, isotropic or anisotropic (i.e., graded pore density).

Fibrous microstructure is most commonly associated with biaxial stretching of films of polymers. This is commonly employed, for example, in the production of porous membranes of polytetrafluoroethylene (TEFLON) ®, in the microporous membranes commercially available as GORETEX ®, among others. It is inherent in the nature of the process that the result is a skinless, symmetrical membrane.

Granular microstructure can be characteristic of membranes formed by the precipitation of polymer from certain formulations by a nucleation and growth mechanism. Globules or granules of precipitated polymer form and grow, and fuse with other such globules at their points of contact, leaving voids in the interstices which contribute the porosity of the granular mass. Such structures frequently contain "macrovoids" or "finger voids" in regions adjacent to skin imperfections which allow the quench liquid to penetrate the interior. The voids consequently are also skinned and lead to reduced membrane permeability. This occurs most commonly in ultraporous and reverse osmosis membranes. The techniques for the formation of such membranes are illustrated by Michaels, U.S. Pat. No. 3,615,024. The granular microstructure and characteristic "macrovoids" are illustrated by the photomicrographs shown in Wang, U.S. Pat. No. 3,988,245.

Cellular pore structures which are honeycombed or sponge-like in appearance, are dependent presumably on a precipitation rate that is slower than with granular structures containing macrovoids. They can be skinned or unskinned. The latter structure generally is formed when the precipitation agent is moisture in the air (no liquid quenching during the curing process). A network of thin struts creates the system of contiguous polyhedral shaped cells. Liquid quenched membranes of this type are often associated with a dense or ultraporous skin.

Spinodal microstructure, as mentioned earlier, occurs when the polymer is precipitated by a spinodal decomposition mechanism, characterized by the formation of two separate liquid phases, one polymer rich and the other polymer poor, under conditions wherein each phase is continuous and dispersed in a characteristic pattern at the point at which the polymer precipitation occurs. Depending on the specific characteristics of the technique for attaining the spinodal decomposition mechanism, the resulting membrane may be, on the one hand, skinless, symmetrical, and uniform throughout, or skinned, asymmetric, and non-isotropic.

In the present application, the term spinodal structure is intended to mean the characteristic structure attained when a membrane is precipitated by spinodal decomposition, and to reflect the features illustrated in FIG. 1 and, in different scale, FIG. 8 which illustrate, by SEM photomicroscopy the remaining structure when the two, intertangled and intermixed continuous phases of spinodal decomposition are achieved. As those of ordinary skill in the art will understand, the spinodal structure represents one of the two continuous phases formed by the precipitated polymer, the other being the void volume within the structure.

The skinless symmetrical variety may be formed by thermal quench techniques or by solvent evaporation techniques. Thermal quenching techniques are illustrated by Castro, U.S. Pat. No. 4,247,498.

Skinned membranes with a highly asymmetric support structure are shown in Wrasidlo, U.S. Pat. No. 4,629,563, and Wrasidlo, U.S. Pat. No. 4,774,039. These membranes are formed by spinodal decomposition induced by solvent extraction from a cast metastable dispersion of two liquid phases, one polymer rich and the other polymer poor, in a liquid quench bath.

All the various techniques involved, and the membranes produced, have achieved a measure of commercial success. The spinodal microstructure, however, has often been preferred in a number of applications. As a general rule, the structure affords good mechanical properties, including tensile strength, elongation at break, and the like, the lowest hydraulic resistance to flow of any of the known microstructures, and offers opportunities to take advantage of the internal structure of the support as a depth filter, as a containment medium for materials, and other like advantages. As is well known to the art, the skinless, symmetric varieties have rather different uses that the skinned, highly asymmetric membranes of Wrasidlo.

In the dispersion casting technique of Wrasidlo, a number of disadvantages have been encountered. These include the following:

When the polymer is precipitated from the dispersion, there are frequent occurrences of small discontinuities. The reason for this is not fully understood, but the result is the formation, within the microstructure of the membrane support, substantial number, and at time vast numbers of tiny polymer spheres. These discrete spheres are difficult to remove by washing, and substantial numbers may remain in the membrane. This is highly undesirable, in most uses of the membranes, since there are few applications where the introduction of these spheres into a filtrate is acceptable. See the spheres illustrated in FIG. 7, which represent a severe case, after normal washing of the membrane.

The procedure for the formation of the membranes taught by Wrasidlo has over time proved to be excessively variable in the controlling pore diameter, flow rate for a given pore diameter, and in the occurrence of macro flaws in the integrity of the skin, leading to the loss of an unacceptable proportion of the membranes to a failure to satisfy necessary quality control standards. Quality control rejection of such membranes often has been substantial.

Some physical properties, including tensile strength and elongation at break, are often lower than desirable, and lower than required for the integrity of some otherwise desirable uses of these membranes.

These membranes are often employed in critical applications in the electronics industry, food processing, processing of biological materials, as sterilizing filters, and the like. Deficiencies in meeting the quality control requirements of such sensitive fields of use are quite unacceptable.

OBJECTS AND SUMMARY OF THE INVENTION

It is an object of the present invention to improve the technology by which skinned, asymmetric ultraporous and microporous membranes having a support structure with an asymmetric spinodal structure are produced, and to provide such membranes with improved properties and characteristics, and to satisfy the highest standards of quality control and product integrity.

The present invention is intended as, and has as its primary object, an improvement on the process and product of Wrasidlo, cited above. The disclosure of the Wrasidlo patents is incorporated herein by reference.

In one aspect, the present invention provides an improved method for making the ultraporous and microporous membranes, wherein interaction of the cast dispersion with the atmosphere prior to solvent extraction in a quench bath is limited to less than 0.5 seconds, and preferably less than 0.25 seconds, and where the casting temperature of the dispersion is materially reduced.

In another aspect of the present invention, ultraporous and microporous membranes are produced which are substantially free of polymer spheres entrained in the support, have increased tensile strength and elongation at break, a materially reduced standard deviation in controlling pore diameter, and an increased population of skin pores, resulting in and demonstrated by exceptionally high flow rates in relation to the controlling pore diameter.

DETAILED DESCRIPTION

Figure 1:
FIG. 1 is a reproduction of an SEM photomicrograph showing the characteristic asymmetric spinodal structure of the support region of membranes of the present invention, in a cross section of a fracture face at an enlargement of 650×.

The present invention is directed to improved membranes, and to the improved method for making such membranes. In the following discussion, a characterization of the method for making membranes is described and characterized initially.

In the method of the present invention, the process of the Wrasidlo patents, discussed and cited hereinabove, is the starting point of the work, and the relevant disclosure of the Wrasidlo method is accordingly incorporated by reference.

In present method, the major elements which differ from Wrasidlo are found in the limitation of the interaction of the cast dispersion with the atmosphere prior to solvent extraction in a quench bath to less than 0.5 seconds, and preferably less than 0.25 seconds, and the employment of a casting temperature of the dispersion materially less than those commonly employed in the usual techniques, generally on the order of about 6° to 14° C. or more. Other process parameters may be subject to adjustment in relation to these parameters to assure the maintenance of the requisite properties in the membrane produced, but these are generally minor in degree and are reactive to and compensatory for the primary changes in the operating conditions and steps.

It has long been known that the cast film of the metastable dispersion in the Wrasidlo technology interacts with the atmosphere, and that the properties of the membrane, and particularly the skin pores of the membrane, are sensitive to variations in temperature and humidity, velocity and direction of air flow, and perhaps others. Controlling these parameters has received a considerable level of attention and, indeed, some have taken steps intended to take advantage of these interactions. See Fuji Photo Film Co. Ltd., G.B. 2, 199,786 A, wherein the exposure and dwell time in the atmosphere and the humidity are increased to attempt to achieve certain benefits. The conventional thinking has been that moisture in the atmosphere initiates the requisite pores at the immediate film/air interface which have diameters proportional to the water vapor concentration and exposure times.

The view in the art for liquid quenched hydrophobic membrane production has at least in part been influenced by the limitations of the commonly employed equipment used to cast and quench such membranes. In large measure, such equipment has been designed and built on the basis that relatively long exposure times in the atmosphere are generally beneficial. It has been common to employ residence times of atmospheric exposure greater than 1 second, and often longer than 5 seconds. Most equipment cannot attain dwell times between the casting operation and the quench bath of less than 1 second without specific modifications. Since such modifications run counter to the conventional wisdom in the art, there has never been any incentive to do so.

It has now been found that residence times of materially less than 1 second, employed with a materially reduced casting temperature, are of quite surprising and unexpected benefit. As discussed in detail below, the membrane product is quite substantially improved in a number of properties and parameters.

As Wrasidlo has previously pointed out, all the parameters of the casting procedure and the conditions of operation are mutually interdependent. A change of one parameter will require a correlating change in at least one other parameter. If the environmental residence time is reduced, as required in the present invention, to less than 0.5 seconds, and preferably less than 0.25 seconds, for a casting formulation and conditions which had been developed for a longer exposure time, of, say, 1 to 5 seconds, an unsuitable membrane will be obtained if no other parameters are adjusted to balance the effect on the system of the rapid passage into the quench liquid.

It has also been known in the art that for any given dispersion and any given set of casting conditions, there is a relatively narrow casting temperature variance which will be effective. This is generally monitored directly, and correlated with the optical density of the metastable dispersion, in order to produce the desired membrane. If the temperature of the casting dope is too high or too low, unsuitable membrane or even no membrane at all will be produced. In the context of the present invention, the appropriate temperature will be lower than that for the same dispersion when cast at longer environmental dwell times, but it is not possible to define the precise temperature without working trials of the system and confirmation of the results through analytical techniques common to the art. As a general rule, the necessary casting temperature will be on the order of 6° to 14° C. or more, often on the order of about 10° to 12° C. below the casting temperature appropriate to 1 second environmental dwell time.

The lower casting temperature is an important benefit to the process. It has been learned that lower temperatures make the system less variable and less vulnerable to variation in substantially all parameters. As the temperature gets closer to ambient temperatures, as one example, distortions of the casting equipment through thermal expansion and like effects are reduced, and it has proved simpler and more reliable to maintain working tolerances. This in turn provides better control over the casting and quenching operations, so that quality of the product is easier to establish and maintain. Utility costs of the operation are reduced and, in new installations, simpler temperature control equipment may prove effective.

It is believed, although there is no wish to be bound thereby, that reduced casting temperature plays a direct role in the reduction of polymer spheres entrained in the membrane as an artifact of small proportions of a separately dispersed phase in the casting dispersion. See FIG. 7, which shows such polymer spheres in a prior art membrane. It appears that the spinodal decomposition mechanism operates more uniformly and exclusively at the lower temperatures employed in the present invention, resulting in substantially no incidence of such polymer spheres. It is possible that this result is partly or wholly attributable to some other factor involved in the system, of course, but it remains the case that the high temperature casting of the prior art consistently produced such polymer spheres, and few and often none are observed in the procedure of the present invention.

In practice, the method of the present invention involves the essential steps of mixing a polymer, a solvent, and a non-solvent to produce a metastable liquid-liquid dispersion consisting of a polymer-rich phase and a solvent-rich (polymer-poor) phase within the binodal or spinodal at a casting temperature, casting the dispersion into a thin film at the casting temperature, passing the cast layer within a time of less than 0.5 seconds at the casting temperature into a solvent extraction quench bath of non-solvent quench liquid in which the solvent is freely miscible and in which the polymer is substantially insoluble, and effecting precipitation of the polymer by spinodal decomposition, and recovering the membrane from the quench bath.

As noted in the Wrasidlo patents, cited above and incorporated herein by reference, a substantial number of polymers, solvents, non-solvents, and quench liquids have been employed, and have been formulated into casting dispersions suitable for casting membranes with a wide spectrum of pore diameters. All of these are contemplated in the present invention. For convenience, the present invention is discussed in the most common of these systems, where the polymer is a polysulfone, the solvent is dimethylformamide, the non-solvent diluent is t-amyl alcohol, and the quench liquid is water.

There are several standard pore diameters which have achieved common commercial acceptance for such polysulfone membranes. These include molecular weight cutoff values of 10,000 and 100,000 Daltons, and pore diameters of 0.1, 0.2 and 0.45 micrometers. The basis for casting the commercially available membranes according to Wrasidlo is shown in Table I:

TABLE I

| Pore Diameter | 10K | 100K | 0.1μ | 0.2μ | 0.45μ |
|---|---|---|---|---|---|
| Polysulfone | 14–16 | 12–14 | 10–12 | 10–12 | 10–12 |
| DMF | 80–82 | 74–76 | 72–74 | 72–74 | 72–74 |
| t-Amyl alcohol | 3–5 | 11–13 | 14–16 | 14–16 | 14–16 |
| O. D. | .08–.10 | .10–.12 | .17–.22 | .20–.32 | .32–.40 |
| Casting Temp. | 49–52 | 49–52 | 49–52 | 49–52 | 49–52 |
| Time to Quench | 1 | 1 | 1 | 1 | 1 |

Notes:
The polysulfone is Amoco Udell P-3500.
All proportions are in weight percent.
O. D. is optical density of the dispersion.
Casting temperature is given in °C.
Time to quench is the dwell time in seconds between the doctor blade and the quench bath.

The corresponding parameters for the same membranes cast in accordance with the present invention are shown in Table II:

TABLE II

| Pore Diameter | 10K | 100K | 0.1μ | 0.2μ | 0.45μ |
|---|---|---|---|---|---|
| Polysulfone | 14–16 | 12–14 | 10–12 | 10–12 | 10–12 |
| DMF | 80–82 | 74–76 | 73–75 | 72–74 | 72–74 |
| t-Amyl alcohol | 3–5 | 11–13 | 14–16 | 14–16 | 14–16 |
| O. D. | .08–.10 | .10–.12 | .24–.25 | .33–.40 | .60–.80 |
| Casting Temp. | 35–43 | 35–43 | 35–40 | 35–39 | 35–39 |
| Time to Quench | 0.1 | 0.1 | 0.1 | 0.1 | 0.1 |

Notes:
The polysulfone is Amoco Udell P-3500.
All proportions are in weight percent.
O. D. is optical density of the dispersion.
Casting temperature is given in °C.
Time to quench is the dwell time in seconds between the doctor blade and the quench bath.

As those of ordinary skill in the art will readily recognize, the residence time between the casting operation and the quench bath is reduced by one order of magnitude. A reduction in casting temperature on the order of about 10° C. is also imposed. In a more general sense, the dwell time should be kept below 0.5 seconds, and preferably below 0.25 seconds, and is desirably the minimum that can be achieved with the constraints of the casting equipment employed.

The casting dispersion should, as noted in the Tables, have an optical density of from about 0.5 to 1, depending on the pore diameter sought; generally, higher optical densities produce higher pore diameters.

The casting dispersion is ordinarily cast onto a moving support by means of a doctor blade with a knife gap of typically about 250 to 450 micrometers, often about 300 micrometers; after the quench, the membrane produced is typically about 85 to 105 micrometers in thickness for ultraporous membranes, and about 105 to about 145 for microporous membranes. The values may be increased or decreased as desired, as is well known in the art. While as described, the procedure produces flat sheet membrane, the present invention is equally applicable to casting hollow fiber membrane, and will indeed facilitate the dispersion casting operation by reducing or even eliminating the atmospheric exposure time previously thought to be necessary to such procedures.

In application of the present invention to the casting of hollow fiber, the casting dispersion is spin cast through a hollow die rather than being cast onto a support in a flat film form. The lumen of the hollow fiber is sometimes formed by air or inert gas and the outside quenched in non-solvent liquid, but usually the quench liquid flows through the center and skins the Lumen. If the lumen is formed by a gas, it should be introduced as close to the quench bath as possible. As those familiar with hollow fiber casting are aware, the die may be immersed in the quench bath in some cases, reducing the atmospheric dwell time of the outer surface of the cast membrane to zero. It is possible, of course, to provide a hollow fiber with both inner and outer skins by employing the quench liquid in both the lumen and the quench bath.

The cast dispersion is passed into a quench bath, most commonly of water, frequently at or near the casting temperature. In the bath, the quench operation precipitates the polymer to produce a skin having the requisite pore sizes, and a support region having the characteristic spinodal structure with a high degree of asymmetry, increasing from the region immediately membrane is ordinarily washed to free it of entrained solvent, and may be dried to expel additional increments of solvent, diluent, and quench liquid, and thus recover the membrane.

The casting operation is amenable to a wide variety of known variations, familiar to those of ordinary skill in the art, as discussed by Wrasidlo and others in the prior art. So long as the criteria defined for the present invention are met, none of these are excluded.

The resulting membrane produced by the process of the present invention shares a number of characteristics in common with those taught by Wrasidlo and used in commerce in the practice of his technology. There are substantial differences which are attained, however.

Figure 7:
FIG. 7 is reproduction of an SEM photomicrograph showing a membrane made in accordance with Example II of Wrasidlo, showing the high population of polymer spheres, in a section of the support region at an enlargement of 1,800×. A spinodal structure is apparent.
Figure 8:
FIG. 8 is a reproduction of an SEM photomicrograph showing a membrane made in accordance with the present invention, showing the very low population of polymer spheres, in a section of the support region at an enlargement of 1,800×. The spinodal structure of the membrane is shown in detail.

It is a very great advantage of the improvements provided by the present invention that the membrane is produced substantially substantially free of the artifacts of discontinuous dispersion in the casting medium. To date, only negligible numbers of polymer spheres have been observed in membranes cast by the method of the present invention. Compare the membrane of the present invention shown in FIG. 8 with FIG. 7, showing the prior art problem, which is now largely resolved. The requirement for the removal of such materials as a part of the membrane wash operations is now eliminated or greatly reduced, reducing the time of the wash, the amount of water or other wash constituents is reduced substantially, and production of finished product are simplified.

It is another significant achievement of the present invention that the pore diameter of the skin pores is far more consistent, as shown by bubble point testing. Testing of membranes of the present invention shows that the bubble points desired are achieved far more readily and consistently at all points in the casting operation, from start-up to conclusion, with markedly reduced standard deviation in pore diameter for all pore sizes. Pore diameter is the primary quality control parameter in such membranes, and bubble point is the convenient parameter for defining microporous membrane integrity, the ultimate criteria being bacterial or microsphere challenge tests.

Figure 2:
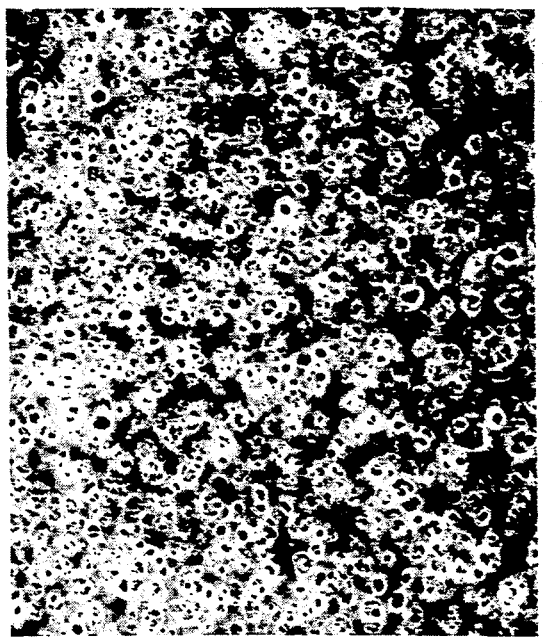
FIG. 2 is a reproduction of an SEM photomicrograph showing the characteristic skin pores of a membrane of the present invention at an enlargement of 3,000×.
Figure 5:
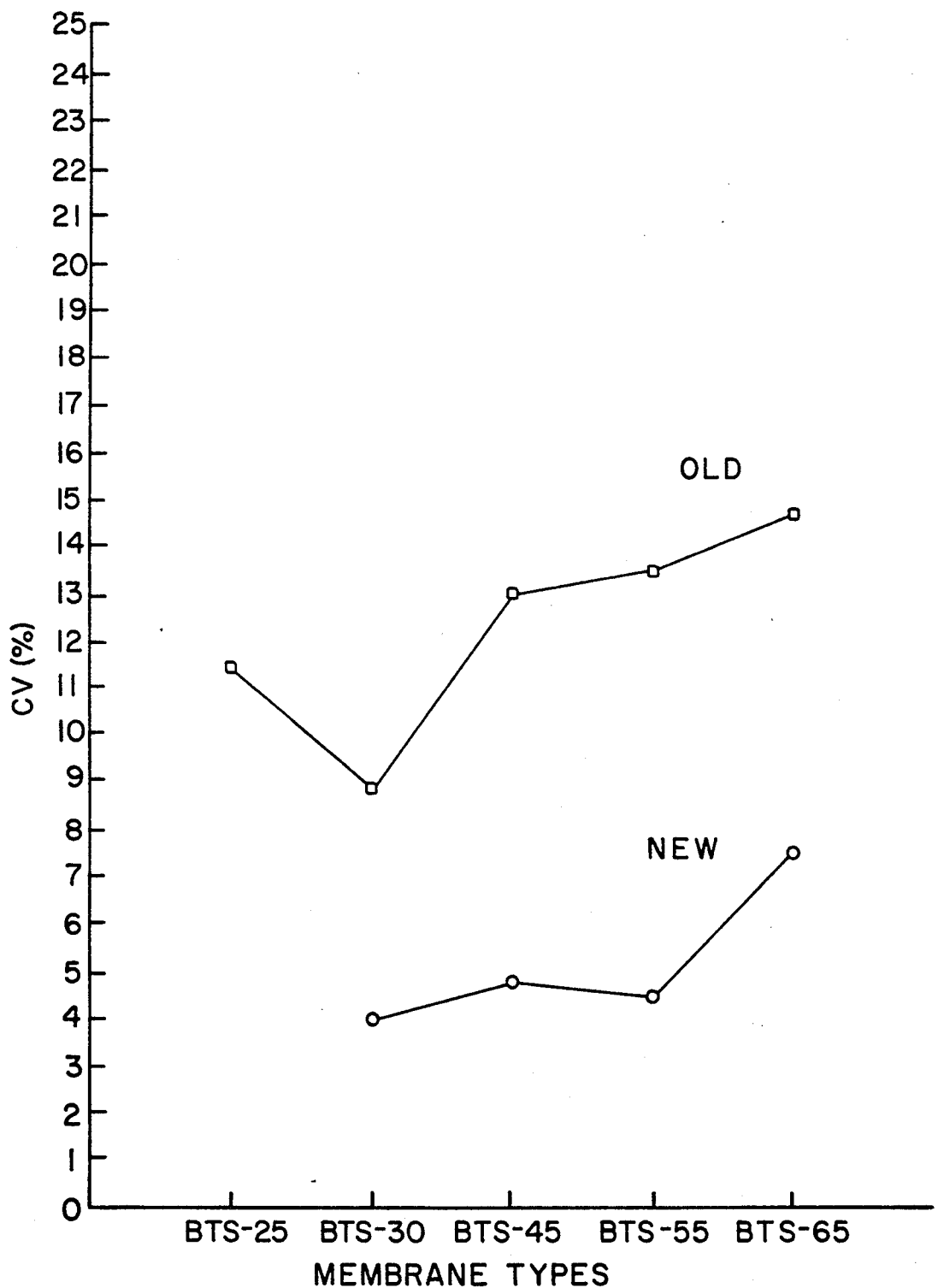
FIG. 5 is a graph of bubble point covariance for membranes of the present invention compared to historical, corresponding measurements of membranes of the prior art, represented by the Wrasidlo patents cited above.

Indeed, for most pore diameters, it is now possible to maintain production at bubble point measurements having a standard deviation of less than 3, compared to a historical value of about 5 or more for such membranes, although in smaller pore sizes it may be necessary to accept a slightly higher standard deviation of less than 5, compared to a historical value of 9 or more for comparable membranes. Covariance in bubble point is less than 8, and ordinarily and preferably less than 5, compared to historic values of 9 or higher, and most often above 11 or even higher, as illustrated in FIG. 5. The skin pores are illustrated in FIG. 2, revealing both a high population of pores, a large proportion of which are at or near the effective controlling pore diameter.

Another feature of the membranes of the present invention is the material increase in flow rates for a given controlling pore size. While the relationships and physical features of the membrane of the present invention which determine flow rates have not been fully explored as yet, the data show a substantial increase in flow rate as a function of pore diameter (or pore radius, as discussed in Wrasidlo). The data suggest an increase in the total number of pores produced in the membrane skin, and possibly a narrower distribution of pore diameter, with few pores having a diameter materially less than the controlling pore diameter as determined by bubble point measurements. See FIG. 2.

Figure 3:
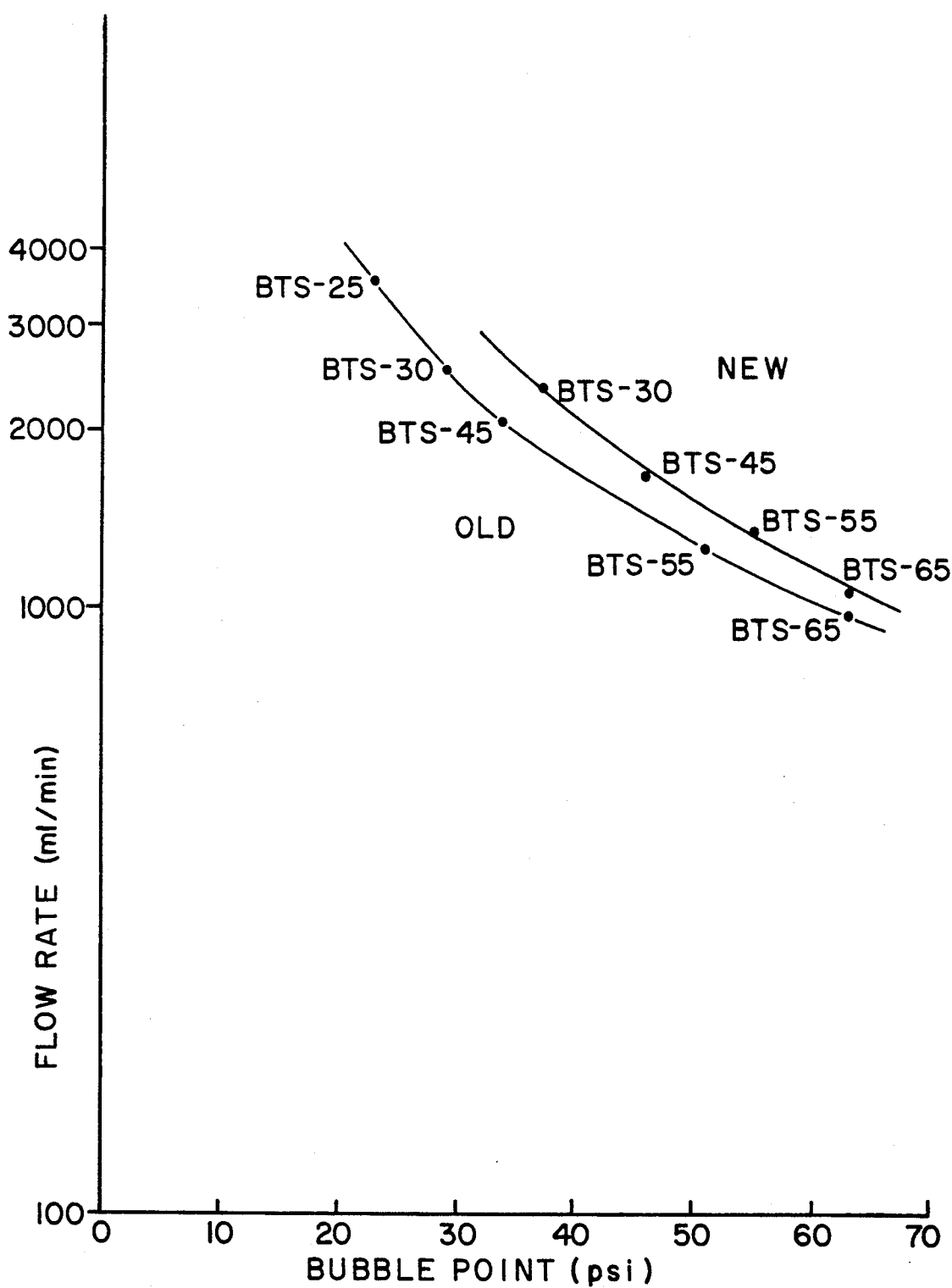
FIG. 3 is a graph showing the relationship of bubble point and flow for membranes of the present invention compared to comparable, historical values for membranes of the prior art, represented by the Wrasidlo patents cited above.

What the data do show with certainty is represented in the data plotted in FIG. 3, which demonstrates flow rate plotted against pore diameter, for the membranes of the examples provided in the present application, including the comparative examples. It is apparent that at a given pore diameter, the flow rate is materially increased in the present invention, when compared to the historical values achieved by the Wrasidlo teachings.

Figure 6:
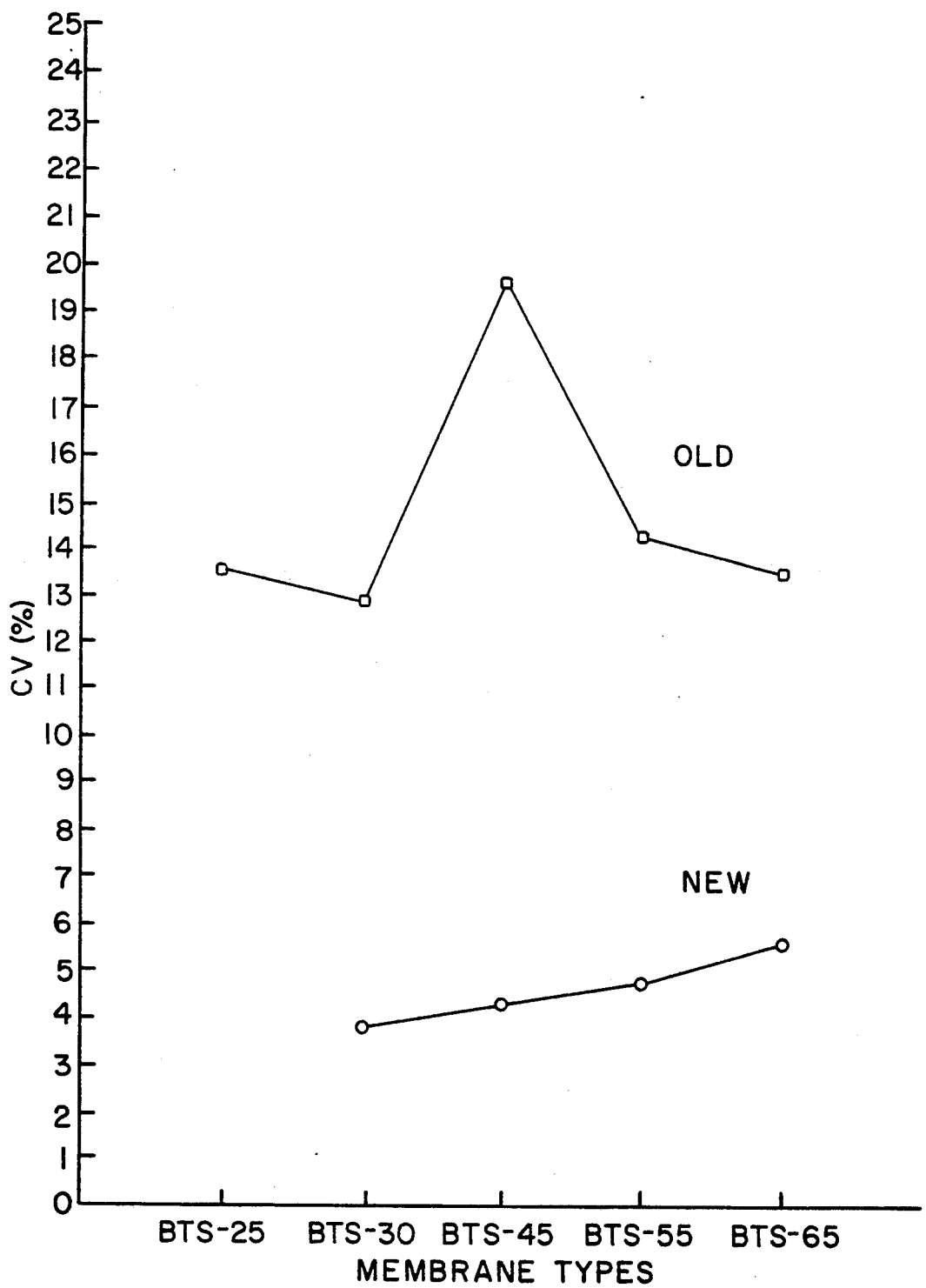
FIG. 6 is a graph of flow rate covariance for membranes of the present invention compared to historical, corresponding measurements of membranes of the prior art, represented by the Wrasidlo patents cited above.

In addition, the flow rates are less susceptible to variation during manufacture of the membrane, as reflected by a standard deviation in flow rate of normally about 120 or less, more often about 100 or less, and less than 75 except for the largest pore diameters. This improved consistency at the higher flow rates is indicative of a material change in the utility of these membranes for the user, and enables the present invention to assure higher levels of quality assurance to users, particularly those with critical applications for such membranes. As shown in FIG. 6, covariance of flow rates of the membranes made by the new procedures of the present invention are less than 6, and for most pore diameters, less than 5. FIG. 6 also demonstrates that flow rate covariance of membranes made by the Wrasidlo procedure has historically been greater than 12.5. Standard deviations are materially reduced as well.

The consistency achieved in the present invention is a per se benefit in the production and use of the membranes of the present invention, and represents a very substantial gain in productivity and the reduction of scrap or out-of specification materials. The occurrence of scrap has been reduced to a level consistently less than 5% of production, and long production runs with no losses to scrap are now frequently attained. The improved consistency is also of compelling import to the integrity of the membrane offered to users.

Figure 4:
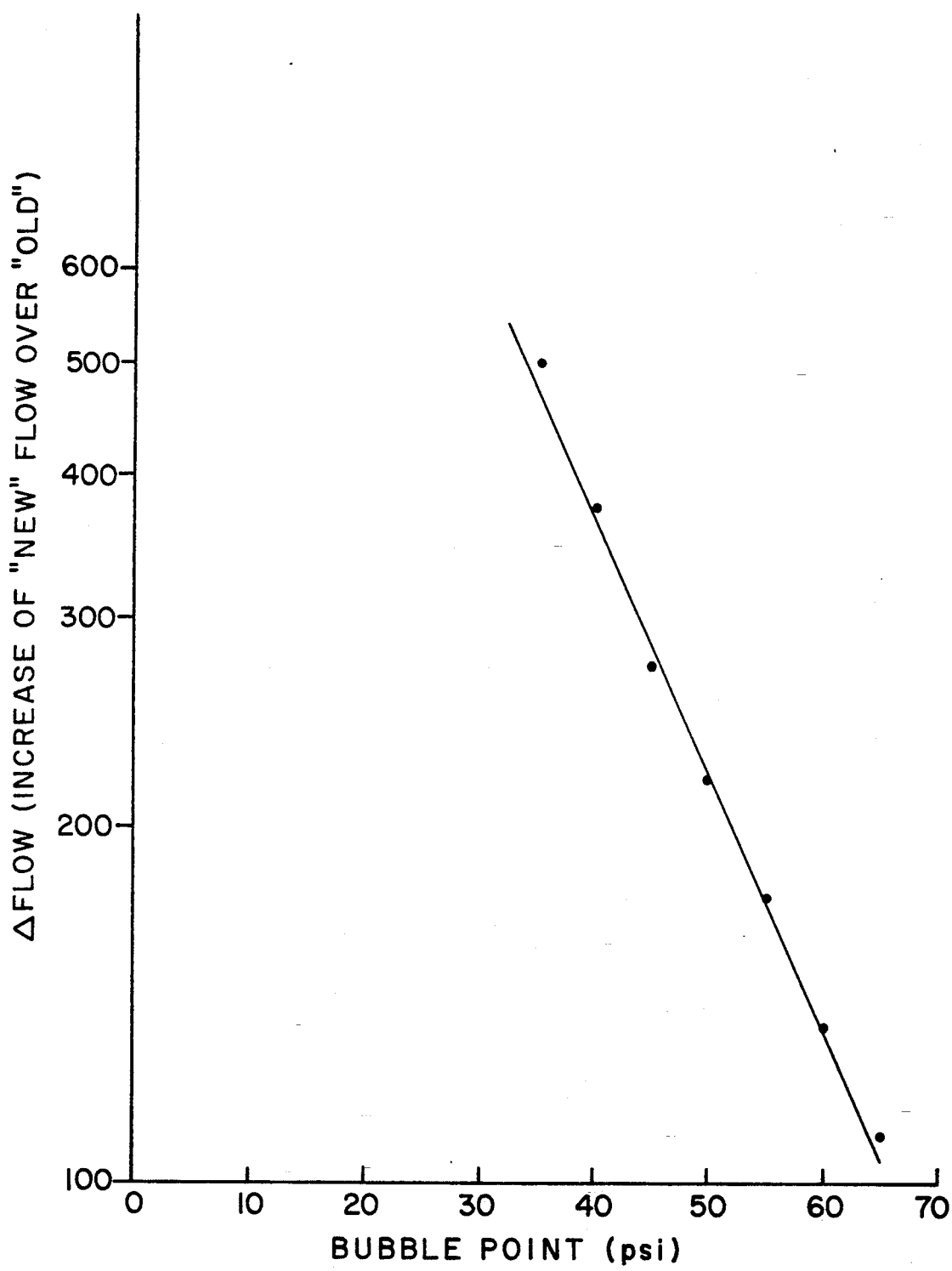
FIG. 4 is a graph showing the relationship of increase in flow rate of the membranes of the invention over the corresponding historical values of production of Wrasidlo membranes of comparable bubble point.

As shown in FIG. 4, the improved consistency in pore diameter and in flow rate are accompanied by a material increase in the flow rate for each pore diameter, ranging from an increase in flow rate of from 110 ml/min. at a bubble point of about 65, up to about 500 ml/min. at a bubble point of about 30, representing a gain in flow rate of 10 to 20 percent at a given pore diameter.

A photomicrograph showing the characteristic spinodal structure of the membranes of the present invention is shown in FIG. 1. As those of ordinary skill in the art will recognize, the structure is that produced by spinodal decomposition of the metastable dispersion in the membrane casting operation, and the figure illustrates the significant asymmetry which makes such membranes highly effective as depth filters, affording the gradual change in the apertures through the support region such that the changing effective pore diameter is progressive.

The skin of the membrane is quite thin, and difficult to delineate precisely by photomicroscopy in cross section. Where skin pores are directly observable, as shown in FIG. 2, the number of pores and their general regularity is directly observable.

A number of membranes have been made and tested in accordance with the present invention, and compared with the commercially available embodiments of the Wrasidlo technology. These efforts and comparisons are set out in the following examples.

SPECIFIC EXAMPLES

In the following examples, the formulations employed are those set forth in Table I and Table II, above. The conditions of casting are also those set forth in the tables. Both the examples of the present invention and those based on the Wrasidlo teachings were performed on the same equipment, and under the same conditions; the only differences are those set forth in the above Tables. As inspection will show, no adjustments of the formulations to achieve specifically targeted pore diameters were made in most cases, with the results that some of the bubble point values are higher than desired. Further adjustments to achieve the desired bubble point, reflecting a specifically required pore diameter are know to the art, and are specifically taught by Wrasidlo.

A plurality of rolls of membrane were cast. Each roll was sampled at a plurality of predetermined locations, across the web and throughout the length of the cast membrane. The values for each sample were averaged, and the standard deviation determined, for both bubble point and flow rate. The results obtained are shown in the following Table III:

TABLE III

| Example | Flow | σ | BP | σ | BRK | σ | ELG | σ |
|---|---|---|---|---|---|---|---|---|
| 30-1 | 2393 | 113 | 38 | 0.8 | 548 | 21 | 26 | 3 |
| 30-2 | 2495 | 100 | 38 | 0.6 | 535 | 14 | 30 | 2 |
| 30-3 | 2340 | 73 | 36 | 1.6 | 544 | 5 | 30 | 3 |
| 30-4 | 2311 | 45 | 37 | 1.1 | 518 | 16 | 27 | 2 |
| 30-5 | 2097 | 73 | 38 | 0.7 | 578 | 14 | 30 | 1 |
| 30-6 | 2337 | 184 | 38 | 2.6 | 607 | 9 | 29 | 2 |
| 30-7 | 2232 | 98 | 38 | 1.4 | 607 | 23 | 26 | 3 |
| 30-8 | 2402 | 74 | 36 | 2.1 | 600 | 23 | 24 | 4 |
| 30-9 | 2470 | 77 | 36 | 1.3 | 558 | 10 | 24 | 2 |
| 30-10 | 2586 | 75 | 35 | 2.3 | 569 | 8 | 24 | 2 |
| 30-AVE | 2366 | 91.2 | 37 | 1.45 | 566 | 14.3 | 27 | 2.4 |
| 45-1 | 1663 | 110 | 45 | 3.1 | 552 | 20 | 29 | 3 |
| 45-2 | 1776 | 83 | 44 | 2.9 | 536 | 8 | 29 | 3 |
| 45-3 | 1495 | 50 | 49 | 3.5 | 521 | 13 | 31 | 2 |
| 45-4 | 1525 | 38 | 47 | 2.1 | 523 | 8 | 29 | 5 |
| 45-5 | 1635 | 53 | 45 | 0.8 | 538 | 9 | 32 | 3 |
| 45-6 | 1671 | 42 | 44 | 1.6 | 525 | 11 | 29 | 2 |
| 45-7 | 1705 | 56 | 44 | 2.2 | 530 | 22 | 29 | 3 |
| 45-8 | 1720 | 75 | 44 | 1.3 | 529 | 7 | 36 | 1 |
| 45-9 | 1742 | 73 | 44 | 3.3 | 520 | 19 | 34 | 5 |
| 45-10 | 1778 | 59 | 42 | 2.2 | 504 | 11 | 28 | 2 |
| 45-11 | 1673 | 114 | 46 | 1.4 | 556 | 14 | 25 | 3 |
| 45-12 | 1844 | 79 | 43 | 3.2 | 548 | 10 | 34 | 4 |
| 45-13 | 1737 | 118 | 47 | 1.5 | 554 | 24 | 30 | 5 |
| 45-14 | 1805 | 52 | 46 | 2.0 | 561 | 8 | 33 | 2 |
| 45-15 | 1697 | 76 | 48 | 1.4 | 554 | 15 | 32 | 3 |
| 45-16 | 1761 | 87 | 48 | 3.0 | 528 | 9 | 29 | 2 |
| 45-17 | 1608 | 76 | 48 | 2.5 | 584 | 12 | 34 | 2 |
| 45-18 | 1779 | 44 | 46 | 3.6 | 569 | 15 | 32 | 2 |
| 45-19 | 1556 | 53 | 48 | 1.7 | 545 | 16 | 32 | 3 |
| 45-20 | 1698 | 32 | 45 | 1.5 | 547 | 16 | 32 | 3 |
| 45-21 | 1626 | 95 | 48 | 1.4 | 513 | 18 | 32 | 3 |
| 45-22 | 1802 | 43 | 44 | 1.7 | 488 | 18 | 30 | 3 |
| 45-23 | 1657 | 123 | 42 | 3.2 | 568 | 6 | 31 | 2 |
| 45-24 | 1747 | 54 | 45 | 3.2 | 561 | 17 | 31 | 4 |
| 45-25 | 1534 | 108 | 48 | 1.6 | 578 | 19 | 29 | 3 |
| 45-26 | 1630 | 84 | 46 | 2.5 | 561 | 17 | 29 | 4 |
| 45-27 | 1634 | 70 | 47 | 2.2 | 572 | 13 | 27 | 3 |
| 45-28 | 1787 | 57 | 44 | 1.8 | 558 | 17 | 29 | 3 |
| 45-AVE | 1689 | 71.6 | 45.6 | 2.2 | 544 | 14 | 31 | 3.0 |
| 55-1 | 1234 | 45 | 57 | 3.0 | 574 | 23 | 36 | 5 |
| 55-2 | 1296 | 64 | 64 | 1.8 | 573 | 14 | 30 | 3 |
| 55-3 | 1192 | 47 | 59 | 3.0 | 612 | 16 | 34 | 4 |
| 55-4 | 1228 | 66 | 58 | 2.0 | 595 | 9 | 34 | 2 |
| 55-5 | 1359 | 101 | 54 | 2.9 | 619 | 11 | 34 | 2 |
| 55-6 | 1418 | 26 | 52 | 2.4 | 598 | 20 | 36 | 4 |
| 55-7 | 1271 | 97 | 56 | 4.0 | 600 | 13 | 39 | 3 |
| 55-8 | 1319 | 55 | 57 | 2.7 | 588 | 16 | 38 | 2 |
| 55-9 | 1284 | 76 | 58 | 4.2 | 613 | 25 | 35 | 6 |
| 55-10 | 1364 | 57 | 57 | 2.5 | 609 | 25 | 35 | 4 |
| 55-11 | 1561 | 97 | 48 | 2.3 | 523 | 20 | 29 | 5 |
| 55-12 | 1598 | 66 | 49 | 2.3 | 555 | 17 | 32 | 4 |
| 55-13 | 1258 | 103 | 56 | 2.8 | 553 | 11 | 39 | 4 |
| 55-14 | 1439 | 36 | 53 | 1.4 | 579 | 15 | 35 | 4 |
| 55-15 | 1253 | 87 | 56 | 3.0 | 533 | 23 | 28 | 4 |
| 55-16 | 1363 | 67 | 54 | 1.0 | 573 | 13 | 35 | 3 |
| 55-17 | 1387 | 39 | 56 | 2.3 | 615 | 12 | 38 | 2 |
| 55-18 | 1430 | 60 | 55 | 3.2 | 586 | 20 | 37 | 4 |
| 55-19 | 1300 | 47 | 56 | 1.7 | 520 | 23 | 34 | 6 |
| 55-20 | 1410 | 49 | 56 | 1.5 | 548 | 25 | 39 | 3 |
| 55-21 | 1290 | 61 | 55 | 3.5 | 571 | 11 | 33 | 4 |
| 55-22 | 1418 | 60 | 54 | 0.9 | 590 | 26 | 35 | 4 |

TABLE III-continued

| Example | Flow | σ | BP | σ | BRK | σ | ELG | σ |
|---|---|---|---|---|---|---|---|---|
| 55-AVE | 1349 | 63.9 | 55.5 | 2.47 | 578.5 | 17.6 | 34.8 | 3.7 |
| 65-1 | 1146 | 50 | 60 | 2.5 | 676 | 22 | 39 | 4 |
| 65-2 | 1403 | 22 | 60 | 2.4 | 665 | 24 | 40 | 4 |
| 65-3 | 1108 | 57 | 59 | 3.7 | 648 | 17 | 44 | 4 |
| 65-4 | 1115 | 36 | 62 | 1.5 | 637 | 26 | 36 | 5 |
| 65-5 | 1060 | 65 | 60 | 3.6 | 613 | 29 | 34 | 5 |
| 65-6 | 1155 | 40 | 60 | 2.4 | 610 | 21 | 33 | 3 |
| 65-7 | 1013 | 46 | 64 | 4.4 | 666 | 19 | 35 | 2 |
| 65-8 | 1037 | 30 | 68 | 2.8 | 697 | 20 | 36 | 3 |
| 65-9 | 859 | 93 | 72 | 12.0 | 664 | 31 | 39 | 2 |
| 65-10 | 854 | 77 | 78 | 8.4 | 648 | 24 | 36 | 3 |
| 65-11 | 986 | 76 | 64 | 7.6 | 614 | 35 | 35 | 7 |
| 65-12 | 931 | 82 | 73 | 7.5 | 616 | 37 | 36 | 5 |
| 65-13 | 949 | 61 | 65 | 6.4 | 713 | 27 | 33 | 4 |
| 65-14 | 1026 | 75 | 62 | 6.9 | 694 | 25 | 33 | 4 |
| 65-15 | 1046 | 79 | 59 | 2.1 | 695 | 24 | 35 | 5 |
| 65-16 | 1095 | 47 | 57 | 2.5 | 684 | 23 | 34 | 4 |
| 65-17 | 1217 | 94 | 55 | 5.3 | 642 | 12 | 38 | 4 |
| 65-18 | 1346 | 50 | 52 | 4.8 | 638 | 23 | 38 | 3 |
| 65-19 | 1019 | 37 | 61 | 2.1 | 657 | 12 | 37 | 2 |
| 65-20 | 1146 | 59 | 58 | 1.7 | 658 | 18 | 38 | 3 |
| 65-21 | 1017 | 50 | 63 | 3.4 | 674 | 14 | 36 | 4 |
| 65-22 | 1101 | 40 | 60 | 3.4 | 688 | 18 | 38 | 4 |
| 65-23 | 932 | 83 | 72 | 9.4 | 668 | 9 | 34 | 2 |
| 65-24 | 1041 | 46 | 63 | 5.8 | 630 | 17 | 32 | 3 |
| 65-AVE | 1058 | 58 | 62.8 | 4.7 | 658 | 22.0 | 36.2 | 3.7 |

In the foregoing data in Table III, each Example represents a roll of membrane, made as described above, bubble point (BP) is reported as the arithmetic mean of all quality control samples taken for each roll. The bubble point represents the pressure, in psi, of breakthrough of air applied to a 90 mm disc sample wetted with distilled water, common to the membrane art. Flow is reported as the arithmetic mean of all samples for each roll and represents the flow of distilled water, in ml per minute, passing through a 90 mm disc at an applied pressure of 10 psi. BRK represents tensile strength at break in grams, while ELG is elongation at break, in percent.

TABLE IV

| | COMPARATIVE EXAMPLES | | | | | | | |
|---|---|---|---|---|---|---|---|---|
| TYPE | Flow | σ | BP | σ | BRK | σ | ELG | σ |
| X65-AVE | 972 | 129.8 | 63.1 | 9.3 | 588 | 24.6 | 29.0 | 3.2 |
| X55-AVE | 1278 | 181.9 | 51.0 | 6.9 | 512 | 19.8 | 24.7 | 2.2 |
| X45-AVE | 2059 | 403.0 | 33.8 | 4.4 | 491 | 35.7 | 23.7 | 3.1 |
| X30-AVE | 2518 | 322.6 | 29.2 | 2.6 | 467 | 26.0 | 21.8 | 2.4 |
| X25-AVE | 3558 | 481.0 | 22.8 | 2.6 | 469 | 22.8 | 23.3 | 2.3 |

In Table IV, the values reported for each comparative example, the values reported are the arithmetic mean of all values for actual commercial production of a substantial number of rolls of membrane, produced as indicated in Table I, under the same conditions as those employed in the present invention, except as noted above.

The principles, preferred embodiments, and modes of operation of the present invention have been described in the forgoing specification and examples. The invention is not intended to be constrained thereby, or construed as limited to the particular forms disclosed, since these are intended to be illustrative rather than restrictive. Variations and changes may be made by those skilled in the art without departing from the spirit and scope of the present invention as defined in the following claims.

What is claimed is:

1. A method of making a highly asymmetric integrally skinned polymer membrane, said method comprising:
   A. mixing a polymer, a solvent and a non-solvent to produce a metastable liquid-liquid dispersion within the binodal or spinodal at a casting temperature, and having an optical density of from about 0.5 to about 1,
   B. casting said dispersion into a thin layer at said casting temperature,
   C. passing said cast layer within a time of less than 0.5 seconds at said casting temperature into a solvent extraction quench bath of non-solvent quench liquid in which said solvent is freely miscible and in which said polymer is substantially insoluble, and effecting precipitation of a major proportion of said polymer by spinodal decomposition, and
   D. recovering from said quench bath a membrane.

2. The method of claim 1 wherein said time is less than about 0.25 seconds.

3. The method of claim 1 wherein said time is not more than about 0.1 seconds.

4. A membrane product which is the product of the process of claim 1.

* * * * *